(12) United States Patent
Tonoyan et al.

(10) Patent No.: US 12,277,043 B2
(45) Date of Patent: Apr. 15, 2025

(54) TEST DATA AUTHENTICATION AND PROCESSING USING SCALABLE DATA STRUCTURES

(71) Applicant: NVIDIA Corporation, Santa Clara, CA (US)

(72) Inventors: Smbat Tonoyan, San Jose, CA (US); Mahmut Yilmaz, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 296 days.

(21) Appl. No.: 17/828,162

(22) Filed: May 31, 2022

(65) Prior Publication Data
US 2023/0409452 A1 Dec. 21, 2023

(51) Int. Cl.
*G06F 11/263* (2006.01)
*G06F 11/27* (2006.01)

(52) U.S. Cl.
CPC ............ *G06F 11/263* (2013.01); *G06F 11/27* (2013.01)

(58) Field of Classification Search
CPC .............................. G06F 11/27; G06F 11/263
See application file for complete search history.

(56) References Cited

U.S. PATENT DOCUMENTS

| | | | |
|---|---|---|---|
| 2016/0191678 A1* | 6/2016 | Brandeburg | H04L 9/3236 370/392 |
| 2020/0195061 A1* | 6/2020 | Montero | H04L 9/0841 |
| 2020/0287707 A1* | 9/2020 | Wilke | H04L 9/0643 |
| 2020/0356547 A1* | 11/2020 | Furukawa | G06F 16/2379 |
| 2020/0379747 A1* | 12/2020 | Kaartinen | G06F 8/65 |
| 2021/0389875 A1* | 12/2021 | Segev | G06F 3/0619 |
| 2022/0201020 A1* | 6/2022 | Aimangala Nagaraja Setty | H04L 63/0236 |
| 2023/0153468 A1* | 5/2023 | Moran | G06F 21/64 726/26 |

* cited by examiner

*Primary Examiner* — Kamini B Patel
(74) *Attorney, Agent, or Firm* — LOWENSTEIN SANDLER LLP

(57) ABSTRACT

A system can include a memory and a processing device, operatively coupled to the memory, to perform operations including receiving a header block of an ordered set of blocks. The header block includes a header block payload and a first digest. The operations further include authenticating, based on the header block payload, the header block, and receiving a first data block of the ordered set of blocks. The first data block includes a first data block payload and a second digest. The operations further include authenticating, based on the first digest, the first data block, and processing the first data block payload.

20 Claims, 5 Drawing Sheets

TEST DATA AUTHENTICATION AND PROCESSING USING SCALABLE DATA STRUCTURES

TECHNICAL FIELD

At least one embodiment pertains to processing resources used to perform and facilitate data authentication and processing. For example, at least one embodiment pertains to technology for test data authentication and processing using scalable data structures (e.g., ordered sets of blocks).

BACKGROUND

Design complexity of System-On-Chips (SoCs) and graphics processing units (GPUs) is increasing among a variety of applications. Example applications include automotive applications, data center applications, etc. Manufacturers are moving to lower semiconductor technology nodes to meet performance requirements of these applications. SoC and GPU integrated circuits (ICs) can be tested during production testing to screen for manufacturing defects.

BRIEF DESCRIPTION OF DRAWINGS

Various embodiments in accordance with the present disclosure will be described with reference to the drawings, in which.

DETAILED DESCRIPTION

Figure 1A:
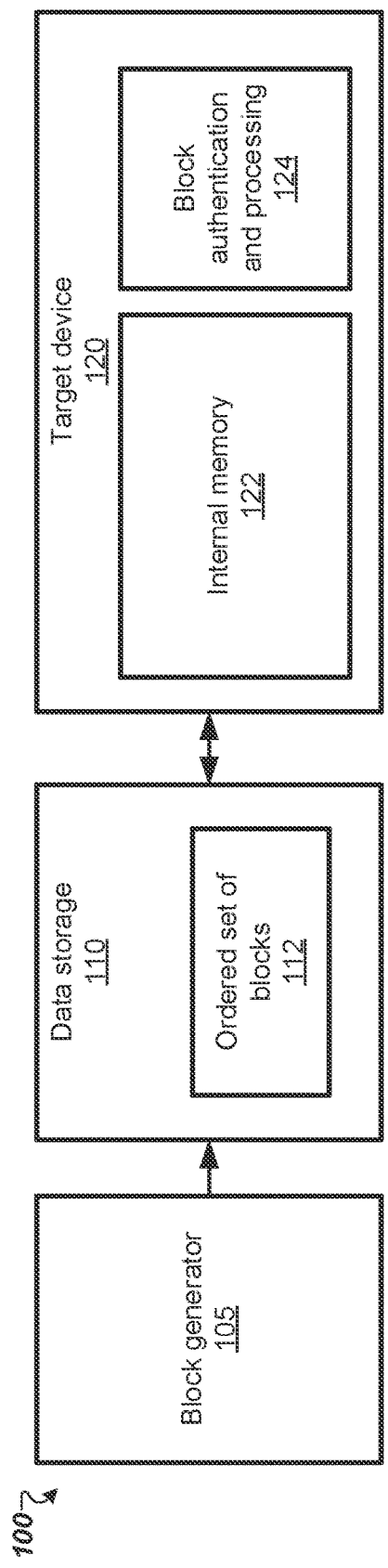
FIGS. 1A-1B illustrates an example system implementing data authentication and processing, in accordance with at least some embodiments.

Some applications, such as automotive drive platform applications, are considered safety critical, such that any integrated circuit (IC) failure could be dangerous. For example, pertinent standards may define functional safety for electronic and electrical equipment used in automotive safety-related systems. These functional safety features form a part of an automotive product development phase. Pertinent standards may also define various Automotive Safety Integrity Levels (ASILs) applicable to the lifecycles of these systems. Different ASIL levels (e.g., A, B, C, and D) can have different test coverage targets. For example, ASIL levels can include A, B, C, and D, where D is the most stringent level that commands the highest test coverage.

Some ICs, such as those used in automotive applications, have built-in functional safety mechanisms, such as error correction code (ECC), functional redundancy, etc. In-system testing (IST) can supplement these safety mechanisms to achieve the highest possible safety level for permanent fault coverage targets (e.g., highest possible ASIL level). In data center applications, IST can be used to periodically check ICs for addressing silent data corruption (SDC) (i.e., silent data error (SDE)). An SDC generally refers to a data error in which there is no indication that the data is incorrect (i.e., the data error remains undetected). For example, SDC can occur when a processing unit (e.g., central processing unit (CPU) or GPU) causes errors in the data it is processing.

IST can involve execution of tests that are based on IST data. The IST data can include deterministic scan test vectors (e.g., structural Automatic Test Pattern Generation (ATPG) vectors), logic built-in self-test (LBIST) sequences, memory built-in self-test (MBIST) sequences and/or Joint Test Action Group (JTAG) sequences. In the case of automotive applications, test data such as test setup, input test vectors, expected results, etc. can be stored on non-volatile memory (e.g., flash drives) on the system board. IST can be configured to run at boot-up time, idle time, or during shut down. In the case of data center applications, IST can be controlled and scheduled by system management software. Test data can be stored in any suitable media for a particular application, and can be moved to system memory before processing. There exist variations of IST, such as run-time IST (RIST), which can run tests on a small portion of the live logic while the rest of the chip is in a functional mode. In such cases, the system memory can be used for faster access. IST can also be used during board-level testing.

IST can be implemented by loading test data (e.g., test patterns) onto a processing device ("target device") for processing (e.g., an IC). In some implementations involving complex ICs, a large amount of test data (e.g., larger number of test patterns) may be loaded into the target device (e.g., multiple gigabytes (GBs)). Due to the potentially large amount of test data, it may be impractical to store all of this data on the target device. Additionally, some advanced technology ICs do not have on-IC non-volatile memory at all. In these situations, the data can be maintained in external storage and loaded onto the target device at runtime, through a high-speed data link. However, since the test data is maintained on external storage, it is susceptible to tampering by an third party who may influence the test results and/or introduce security issues into the target device.

Aspects of the present disclosure can address the deficiencies above and other challenges by implementing test data authentication and processing using scalable data structures. A scalable data structure can include test data. In some embodiments, the test data can include test pattern data. The test data can be received by (e.g., loaded onto) a target device including an IC for authenticating and processing the test data to perform a test. For example, the test data can be processed by the target device to perform a built-in self-test.

A scalable data structure can be defined by an ordered set of blocks. For example, the ordered set of blocks can be a chain of blocks ("blockchain"). The ordered set of blocks can be generated by a block generator and stored on external storage relative the target device. For example, the block generator can be a device that can be operated by a user overseeing the testing of the target device (e.g., a quality assurance engineer). The ordered set of blocks can include a header block and a number of test data blocks that are organized in a sequential order for test data processing ("processing order"). The header block serves as the initial block of the ordered set of blocks. Each test data block can include a respective portion of the test data as payload data for the test data block. As will be described in further detail herein, the target device can receive, authenticate, and process the test data block-by-block, thus preventing a third party from tampering with the data after it has been successfully authenticated, while tailoring the block size to the amount of memory that is available on the target device.

To sequentially link each block together and support block authentication, each block of the ordered set of blocks (except for the final test data block) can, in addition to the payload, include a digest of the next test data block to be processed by the target device. The digests can be generated using a suitable digest generation method based on the input block data. More specifically, a digest can be represented by a cryptographic hash value ("hash"). The hash can be generated by a suitable hash function, which is a one-way function that produces the same output data for a given input, while producing different outputs for even slightly different inputs. A one-way function is a function that is impractical to reverse (i.e., identify the input corresponding to a given output) due to the computational complexity involved. Although the input of the hash function can be of an arbitrarily size, the output hash can have a fixed size as defined by the hash function. During an integrity check of a test data block, a processing device can generate a digest for the test data block, and can compare the generated digest to the digest for the test data block that is maintained within the previous test data block ("stored digest"). Accordingly, an attempted change to a data block will fail an integrity check, since the generated digest would not match the stored digest.

The header block, which is the first block to be processed and thus would not have a digest supplied by a previously processed block, can be authenticated by another mechanism. For example, the header block can include a digital signature. The digital signature can be obtained by digitally signing the digest of the initial test data block. The digest of the header block can be signed using any suitable digital signature algorithm. For example, the digital signature algorithm can be a public key based digital signature algorithm (e.g., public key infrastructure (PKI) digital signature algorithm). Illustratively, the digest of the initial test data block can be digitally signed by a private key of the block generator to obtain the digital signature. Upon receipt of the digital signature, the target device can authenticate the digital signature using a public key of the block generator. The validity of the public key of the block generator can be proven using a digital certificate, which can be generated by a trusted third-party certificate authority. The final block of the ordered set of blocks, which is the final data block to be processed, would not have a digest of the next block to be processed. Instead, the final block can include a predefined data pattern indicating the finality of the final data block. For example, the predefined data pattern can be a predefined number of "0" bits.

To initiate the data authentication and processing, the target device can store the header block. For example, storing the header block can include receiving the header block from the external storage, and load the header block into internal memory of the target device. The internal memory can be physically and/or cryptographically protected. The header block can include a digest of the initial test data block. Upon receiving the header block, the target device can authenticate the header block. If the target device successfully authenticates the header block, then the target device can store the digest of the initial test data block, obtained from the header block, in the internal memory to obtain a stored digest.

The target device can then store the initial test data block (e.g., receive the initial test data block from the external storage, and load the initial test data block into the internal memory of the target device), and authenticate it by generating its digest and comparing the generated digest with the stored digest. Each test data block, except for the final test data block, can include the digest of the next test data block for processing, and a payload (which can include, e.g., a portion of the test data for performing the self-test of the target device). If the target device successfully authenticates the initial test data block, then the digest of the next test data block for processing can be extracted from the initial test data block and stored in the memory of the target device (e.g., cached), and the payload of the initial test data block can be processed. After processing the payload of the initial test data block, the target device can then purge the digest of the current data block from the internal memory (e.g., invalidate the cache).

After the initial test data block is processed, a similar process can be performed for each remaining test data block until the final test data block is successfully authenticated, and the payload of the final test data block (e.g., final portion of the test data) is processed. For example, authenticating the final test data block can include comparing a stored digest of the final test data block (which was extracted from the penultimate test data block and stored in the internal memory of the target device) to a generated digest of the final test data block. After processing the payload of the final test data block, the target device can purge the internal memory for data security. If the target devices fails to successfully authenticate any of the blocks (e.g., the header block or any of the test data blocks), then the process can be aborted and the target device can purge the internal memory (e.g., invalidate the cache) for data security.

In some embodiments, the target device can receive and preprocess multiple blocks in parallel. For example, the target device can precompute multiple digests of multiple blocks in parallel, and store the multiple digests within the internal memory of the target device. The number of blocks that can be preprocessed in parallel is subject to the available internal memory being sufficient to store the multiple digests. In these embodiments, the authentication and test data processing performed by the target device will still be serial in the order defined by the ordered set of blocks.

As mentioned above, a block generator can generate each block of the ordered set of blocks (e.g., the header block and the set of test data blocks). As also mentioned above, the blocks are organized in a processing order of how the blocks are to be received and processed by the target device (i.e., the header block is the first block to be processed, followed by the initial test data block, until the final test data block). The block generator can generate the blocks in a reverse order with respect to the processing order (i.e., starting with the final test data block and ending with the header block). This is done to properly compute the digests used to link adjacent blocks within the processing order of the ordered set of blocks. For example, the final test data block within the processing order can be generated by inserting the predefined data pattern and the respective payload (e.g., portion of the test data) within the final test data block. Then, the penultimate test data block within the processing order can be generated by computing a digest of the final test data block, and inserting the digest of the final test data block and the respective payload within the penultimate test data block. The process of generating a test data block by computing a digest of the previously generated block (i.e., the next block within the processing order) and inserting the digest and the respective payload within the test data block can continue until the block generator generates the initial test data block. At that point, the block generator can then generate the header block by computing a digest of the initial test data block and a payload for authenticating the header block (e.g., a digital signature of the digest), and inserting the digest and the payload within the header block. Accordingly, by generating the blocks in the reverse order with respect to the processing order, the blocks can be properly authenticated and processed by the target device as described above.

Embodiments described herein can enable high-speed test data transfer of a potentially large amount of test data without consuming expensive on-target device storage resources. For example, embodiments described herein can avoid having to buffer the test data within the internal memory of the target device before authentication and processing. Therefore, embodiments described herein can reduce consumption of computing resources (e.g., memory resources). Moreover, embodiments described herein can reduce (e.g., eliminate) security issues present in other data authentication schemes without having to load the entirety of the test data into on-target device memory for authentication. For example, by reducing (e.g., eliminating) the length of time between authentication and use, embodiments described herein can mitigate the risk of a time-of-check to time-of-use (TOCTOU) attack on the test data, during which an attacker corrupts the test data after authentication and before use.

Figure 1B:
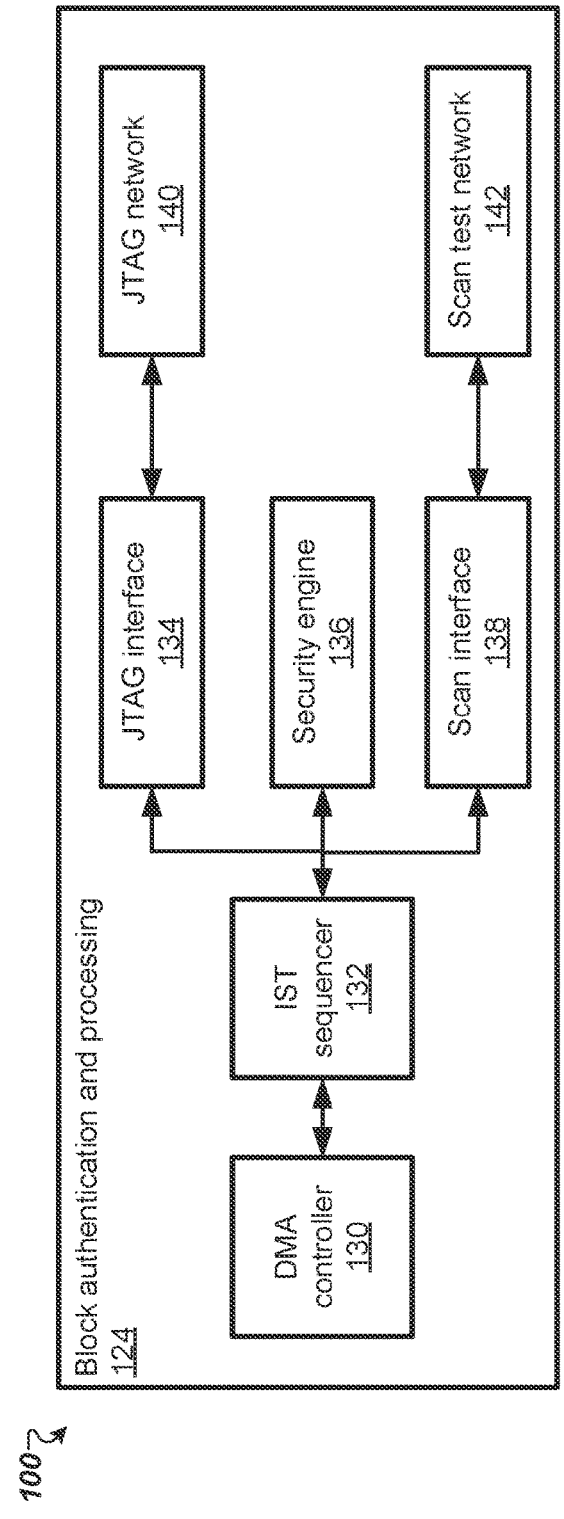

FIGS. 1A-1B illustrate an example system 100 implementing data authentication and processing, in accordance with at least some embodiments. As shown in FIG. 1A, the system 100 includes a block generator 105 operatively coupled to data storage 110, and a processing device ("target device") 120 operatively coupled to the data storage 110. More specifically, the data storage 110 is external data storage relative to the target device 120.

The block generator 105 is configured to form an ordered set of blocks 112 and store the ordered set of blocks 112 on the data storage 110. In some embodiments, the ordered set of blocks is a blockchain. The blocker generator 105 can include hardware and/or software.

The block generator 105 can form the ordered set of blocks 112 from data. In some embodiments, the data includes raw data to be processed by the target device 120. For example, the data can include test data to be processed for performing a test on the target device 120 (e.g., in-system testing (IST)). Examples of test data include deterministic scan test vectors (e.g., structural Automatic Test Pattern Generation (ATPG) vectors), logic built-in self-test (LBIST) sequences, memory built-in self-test (MBIST) sequences and/or Joint Test Action Group (JTAG) sequences. Further details regarding the test data will be described below with reference to FIG. 1B.

The ordered set of blocks 112 can be formed to include a header block and a set of data blocks. More specifically, the header block serves as the initial block of the ordered set of blocks. Each data block of the set of data blocks is generated to include a respective payload. The payload of each data block includes a respective portion of the set of data. The ordered set of blocks 112 is organized in a sequential order for data processing ("processing order"). After the header block, the data blocks are organized in order of the processing of their respective payloads by the target device.

To form the ordered set of blocks 112, the block generator 105 generate each block of the ordered set of blocks 112 in reverse order relative to the processing order. For example, the block generator 105 can first generate each data block of the set of data blocks. More specifically, the final data block can be generated first, followed by the penultimate data block, and then the first data block. The final data block can be generated to include a final payload (e.g., a final portion of the data) and a predefined data pattern indicating that the final data block includes the final payload. For example, the predefined data pattern can be a predefined number of "0" bits. The penultimate data block can be generated to include a penultimate payload (e.g., a penultimate portion of the data) and a digest of the final data block (e.g., hash) that can be used to authenticate the final data block. The remaining data blocks can be similarly generated, in the reverse order, to include a respective payload (e.g., a respective portion of the data) and a respective digest of a next data block within the processing order.

After generating the first data block, the block generator 105 can then the header block. For example, the header block can include a digest of the first data block and a payload that can be used for initial authentication of the ordered set of blocks. For example, payload of the header block can be generated by obtaining a digital signature of the digest of the first data block. The digital signature can be determined using any suitable digital signature generation method (e.g., PKI digital signature method). For example, obtaining the digital signature can include encrypting the digest of the first data block with a private key. The target device could then validate the digital signature by decrypting the digital signature with a corresponding public key. An example illustration of the ordered set of blocks 112 will be described in further detail below with reference to FIG. 2.

The target device 120 can include internal memory 122 (e.g., cache) and a block authentication and processing component 124. In some embodiments, the internal memory 122 includes protected internal memory to provide physical and/or cryptographic security for the data stored on the internal memory 122. The target device 120 is configured to authenticate each block of the ordered set of data blocks 112 in a manner that can prevent a third party from tampering with the block after it has been successfully authenticated, while tailoring the block size to the amount of available memory that is available on the internal memory 122.

For example, the target device 120 can receive the header block from the data storage 110. The target device 120 can then perform header block authentication performed by the block authentication and processing component 124. The header block authentication can be performed to determine whether to initiate data processing with respect to the set of data blocks. The header block authentication can be performed using the payload of the header block. For example, the header block authentication can be performed by verifying the digital signature as valid.

If the header block is successfully authenticated (e.g., the digital signature is determined to be valid), this means that the header block is trustworthy (e.g., the content of the header block has likely not been tampered with by an attacker). The target device 120 can store the digest of the first data block within the internal memory 122, and initiate data processing. Initiating test data processing can include causing the target device to enter a test mode to begin processing test data.

The target device 120 can then receive the first data block from the data storage 110, and initiate authentication of the first test data block. The authentication of first data block can be performed by the block authentication and processing component 124 to determine whether it is safe to process the respective portion of the data (e.g., the content of the initial test data block has likely not been tampered with by an attacker). The first data block authentication can be performed using the digest of the first data block that was stored in the internal memory 122 after authentication of the header block ("stored digest"). More specifically, the block authentication and processing component 124 can generate the digest first data block to obtain a generated digest, and compare the generated digest to the stored digest to determine whether they match.

If the authentication of the first data block is determined by the target device 120 to be successful (i.e., the generated digest matches the stored digest), this means that the first data block has been authenticated. The target device 120 can store the digest of the second data block to be processed in accordance with the processing order within the internal memory 122, and can cause the block authentication and processing component 124 to process the payload of the first data block. Processing the payload can include processing the portion of the test data to perform a test within the target device 120 (e.g., IST).

A similar process can be used to authenticate and process the remaining data blocks of the ordered set of blocks 112 in accordance with the processing order. Thus, the data blocks can be serially authenticated and processed. In some embodiments, the block authentication and processing component 124 can generate, in parallel for each data block of a plurality of data blocks, a respective digest of the data block. More specifically, the block authentication and processing component 124 can precompute multiple digests in parallel, subject to availability of memory within the internal memory 122. This parallel processing can improve the operational efficiency of the block authentication and processing component 124.

Upon authenticating and processing the final test data block, the predefined data pattern indicates, to the block authentication and processing component 124, that the final payload has been processed and thus the authentication and test data processing is complete. The target device 120 can then cause data (e.g., digests and/or payloads) to be purged from internal memory 122 (e.g., cause invalidation of the cache of the internal memory 122).

If an authentication performed by the block authentication and processing component 124 are determined to be unsuccessful (e.g., header block authentication or data block authentication), this means that the corresponding header block or data block is not trustworthy and the data processing has failed. The target device 120 can abort the data authentication and processing and cause data (e.g., digest data) to be purged from the internal memory 122. Further details regarding the ordered set of blocks and the operations of the target device 120 will now be described below with reference to FIGS. 1B-5.

Each portion of data of a respective data block can include raw test data ("test data") for processing by the block authentication and processing component 124 to perform a test on the target device 120. For example, the test data can include IST data. The IST data can include, for example, JTAG sequences for setup and initialization programming, BIST data (e.g., MBIST and/or LBIST sequences and corresponding test data), scan test data such as deterministic scan test vectors (e.g., stimuli and expected results), etc.

In some embodiments, and as shown in FIG. 1B, the block authentication and processing component 124 can include a number of subcomponents. For example, the block authentication and processing component 124 can include a direct memory access (DMA) controller 130, an IST sequencer 132, a JTAG interface 134, a security engine 136 and a scan interface 138. The system 100 can further include a JTAG network 140 and a scan test network 142. The JTAG network 140 and the scan test network 142 can be operatively coupled to the JTAG interface 134 and the scan test network 142, respectively, for communicating with the block authentication and processing component 124.

The test data can retrieved using the DMA controller 130 and then authenticated before it is sent to downstream logic. Data authentication is done continuously by the block authentication and processing component 124 as each data block is received from the data storage 110. For example, the IST sequencer 132 can run the test flow, including loading the blocks and the authentication process. The security engine 136 can perform cryptographic calculations such as digital signature verification, digest (e.g., hash) computations, etc. If the payload of a data block includes a portion of test data corresponding to a JTAG sequence, it is sent to the JTAG network 140 via the JTAG interface 134. JTAG network 140 is the control backbone of the test architecture and can cause the target device 120 to be placed into the test mode (e.g., in response to authenticating the header block). After the target device 120 is placed in the test mode and is ready to initiate the IST, the block authentication and processing component 124 can retrieve, from the data storage 110, data blocks for authentication and processing in accordance with the processing order. The payload of each data block can include a portion of test data for performing the IST (e.g., scan test data or BIST data). For example, scan test data can be redirected to the scan test network 142 via the scan interface 138. The scan test can be performed by loading almost a number of scan test flip-flops with known values (e.g., scan test stimuli vectors), and then toggling functional clocks. Circuit responses can also be captured in the scan test flip-flops. These circuit responses can be compressed using multiple input signature registers (MISRs), exclusive-or (XOR) trees, etc. At the end of the test, a final test response signature can be compared to an expected response to determine whether they match.

Figure 2:
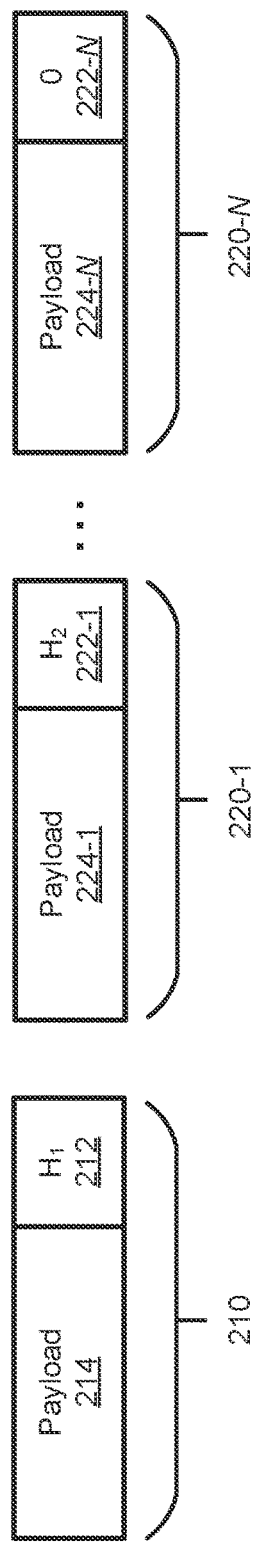
FIG. 2 illustrates an example diagram of an ordered set of blocks, in accordance with at least some embodiments.

FIG. 2 is an example ordered set of blocks 200, in accordance with at least some embodiments. The ordered set of blocks 200 can be generated by a block generator, such as the block generator 105 of FIG. 1A. For example, the diagram 200 shows a header block 210 and a set of data blocks 220-1 through 220-N organized in a processing order. Each of the data blocks 220-1 through 220-N can include a respective portion of data. For example, the data can include raw data to be processed by a target device (e.g., the target device 120 of FIG. 1A). In some embodiments, the set of data blocks 220-1 through 220-N is a set of test data blocks, and each of the data blocks 220-1 through 220-N can include a respective portion of test data that can be processed by the target device to perform a test (e.g., IST).

The header block 210 includes a digest of the data block 220-1. In this illustrative example, the digest of the data block 220-1 is a hash of the data block 220-1 ($H_1$) 212. The digest of the data block 220-1 can be used to authenticate the data block 220-1. For example, to authenticate the data block 220-1, the target device can store $H_1$ 212 in internal memory (e.g., internal memory 122 of FIG. 1A), generate a hash of the data block 220-1, and compare the stored $H_1$ 212 to the generated hash of the data block 220-1 to determine whether they match. The header block 210 further includes a payload 214. In some embodiments, the payload 214 includes a digital signature of $H_1$ 212. For example, the payload 214 can be generated by encrypting $H_1$ 212 with a private key (e.g., a private key of the block generator). The payload 214 can be used to authenticate the header block 210. For example, the target device can decrypt the payload 214 with a public key (e.g., a public key of the block generator).

The data block 220-1 includes a digest of the next data block in the processing order (i.e., data block 220-2). In this illustrative example, the digest of the data block 220-2 is a hash of the data block 220-2 ($H_2$) 222-1. Similar to the above, to authenticate the data block 220-2, the target device can store $H_2$ 222-1 in internal memory, generate a hash of the data block 220-2, and compare the stored $H_2$ 222-1 to the generated hash of the data block 220-2 to determine whether they match. The data block 220-1 can further include a payload 224-1. The payload 224-1 can include a first portion of the data (e.g., test data). Although not shown in FIG. 2, each of the data blocks 220-2 through 220-(N−1) can similarly include a respective digest of a next data block in the processing order (e.g., $H_3$ 222-2 for the data block 220-2), and a respective payload including a respective portion of the data (e.g., payload 224-2 for the data block 220-2).

The data block 222-N includes a predefined data pattern 222-N and a payload 224-N. The payload 224-N includes the final portion of the data. The predefined data pattern 222-N indicates that the payload 224-N includes the final portion of the data, and that the authentication and processing can be terminated. In some embodiments, and as shown in FIG. 2, the predefined data pattern 222-N can be a predefined number of "0" bits. Accordingly, the blocks 210 and 220-1 through 220-N can be cryptographically linked by a hash chain and organized in sequential order of the processing of their respective payloads.

Figure 3:
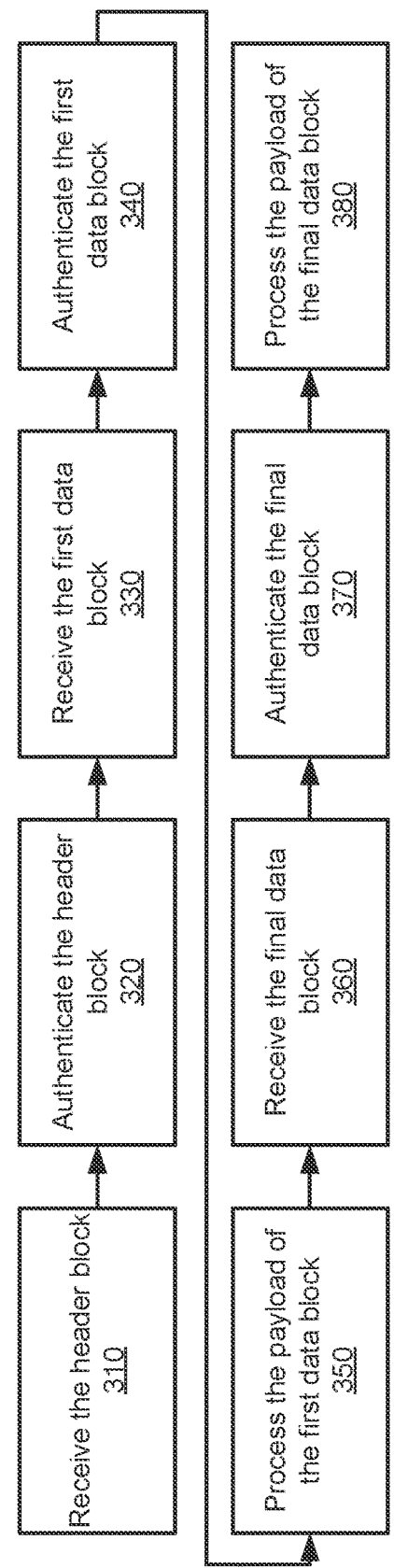
FIG. 3 is a flow diagram of an example method to implement data authentication and processing, in accordance with at least some embodiments.

FIG. 3 illustrates a flow diagram of a method 300 to implement data authentication and processing, according to at least one example embodiment. The method 300 can be performed by processing logic comprising hardware, software, firmware, or any combination thereof. In at least one embodiment, the method 300 is performed within a target device, such as the target device 120 described above with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams are possible.

It is assumed that each block of an ordered set of blocks had previously been generated, such as by a block generator (e.g., the block generator 105 of FIG. 1A). For example, the ordered set of blocks can include a header block and a set of data blocks. The set of blocks can be ordered in the order the blocks are expected to be processed by the target device. More specifically, the header block is an initial block of the ordered set of blocks, and the set of data blocks is organized in a data block processing order.

The header block can be generated to include a digest of a first data block to be processed in the data block processing order, and a header block payload. As will be described in further detail below, the header block payload can be used to authenticate the header block. For example, the header block payload can include a digital signature of the digest of the first data block. The digital signature can be generated using any suitable digital signature generation method (e.g., PKI digital signature method). For example, the digest of the first data block can be encrypted with a private key (e.g., a private key of the block generator) to generate the digital signature. The private key can be paired with a public key (e.g., a public key of the block generator), which can be used to verify the digital signature, as will be described in further detail below.

Each data block of the set of data blocks, except for the final data block, can be generated to include a respective digest (e.g., hash) of the next data block to be processed in the data block processing order, and a respective data block payload. As will be described in further detail below, each digest can be used to authenticate the next block prior to processing of the next block, and each data block payload can include a portion of data to be processed by a target device. For example, the portion of data can include a portion of test data to be processed by the target device to perform a test (e.g., IST). Since there is no data block that follows the final data block, the final data block does not include a digest of the next data block to be processed in the data block processing order. Instead, the final data block can include a predefined data pattern indicative of the final data block including the final payload (e.g., final portion of the data). For example, the predefined data pattern can be a predefined number of "0" bits. However, such an example should not be considered limiting.

The ordered set of blocks can be stored in data storage external to the target device ("external data storage"). For example, the block generator can store the ordered set of blocks in the external data storage. Further details regarding generating the ordered set of blocks are described above with reference to FIGS. 1-2 and will be described in further detail below with reference to FIG. 5.

At operation 310, processing logic receives the header block. For example, the header block can be received from the external data storage. The processing logic can store the header block in the memory of the target device upon receipt.

At operation 320, processing logic authenticates the header block. More specifically, the header block is authenticated based on the header block payload. For example, if the header block payload includes a digital signature of the digest of the first data block, then authenticating the header block can include verifying the digital signature (i.e., determining that the digital signature is valid). For example, authenticating the header block can include decrypting the header block payload with a public key (e.g., a public key of the block generator). After authenticating the header block, the processing logic can extract, from the header block, the digest of the first data block and store the digest in the memory of the target device. For example, the digest can be stored in cache (i.e., cached). Moreover, authenticating the header block can cause the target device to enter a processing mode for processing the respective portions of data included in the set of data blocks. For example, the processing mode can be a test data processing mode for processing the respective portions of test data included in the set of data blocks.

At operation 330, processing logic receives the first data block. For example, the first data block can be received from the external storage. The processing logic can store the first data block in the memory of the target device upon receipt. For example, the storing the first data block can include receiving the first data block from the external data storage.

At operation 340, processing logic authenticates the first data block. More specifically, the processing logic can authenticate the first data block based on the stored digest of the first data block, which was extracted, by processing logic, from the header block after authentication as described above. Authenticating the first data block can include generating a digest of the first data block and comparing the generated digest to the stored digest. After authenticating the first data block, the processing logic can extract, from the first data block, the digest of the second data block and store the digest in the memory (e.g., cache) of the target device.

At operation 350, processing logic processes the payload of the first data block ("first payload"). For example, processing the first payload can include processing the first portion of data. In some embodiments, processing the first payload includes processing and utilizing the first portion of test data to perform a test. For example, the first portion of test data can be processed and used to perform in-system testing (IST) of the target device. Thus, the test can be a built-in self-test (BIST). The test can be used to address potential issues with respect to operation of the target device, such as, e.g., silent data corruption (SDC). After processing the first payload, processing logic can similarly perform operations 330-350 to authenticate and process subsequent data blocks of the set of data blocks.

At operation 360, processing logic receives the final data block. For example, the final data block can be received from the external storage. The processing logic can store the final data block in the memory of the target device upon receipt.

At operation 370, processing logic authenticates the final data block. More specifically, the processing logic can authenticate the final data block based on a stored digest of the final data block. For example, processing logic can, after authentication of the data block that was processed immediately before the final data block (i.e., the penultimate data block), extract the digest of the final data block from the penultimate data block, and store the digest in the memory of the target device. Authenticating the final data block can include generating a digest of the final data block and comparing the generated digest to the stored digest. After authenticating the final data block, the predefined data pattern can be stored in the memory (e.g., cache) of the target device.

At operation 380, processing logic processes the payload of the final data block ("final payload"). For example, processing the final payload can include processing the final portion of data. The final portion of data can be processed and utilized for performing the test (e.g., IST). After processing the final payload, processing logic can purge the final payload and/or the stored digest from the memory of the target for data security device (e.g., the cache can be invalidated).

In some embodiments, processing the first payload at operation 350 and processing the final payload at operation 380 includes processing respective portions of test data to perform a test. For example, the processed portions of data can be used perform in-system testing (IST) of the target device. Thus, the test can be a built-in self-test (BIST). The test can be used to address potential issues with respect to operation of the target device, such as, e.g., silent data corruption (SDC). Further details regarding operations 310-390 are described above with reference to FIGS. 1-2 and will be described in further detail below with reference to FIGS. 4-5.

Figure 4:
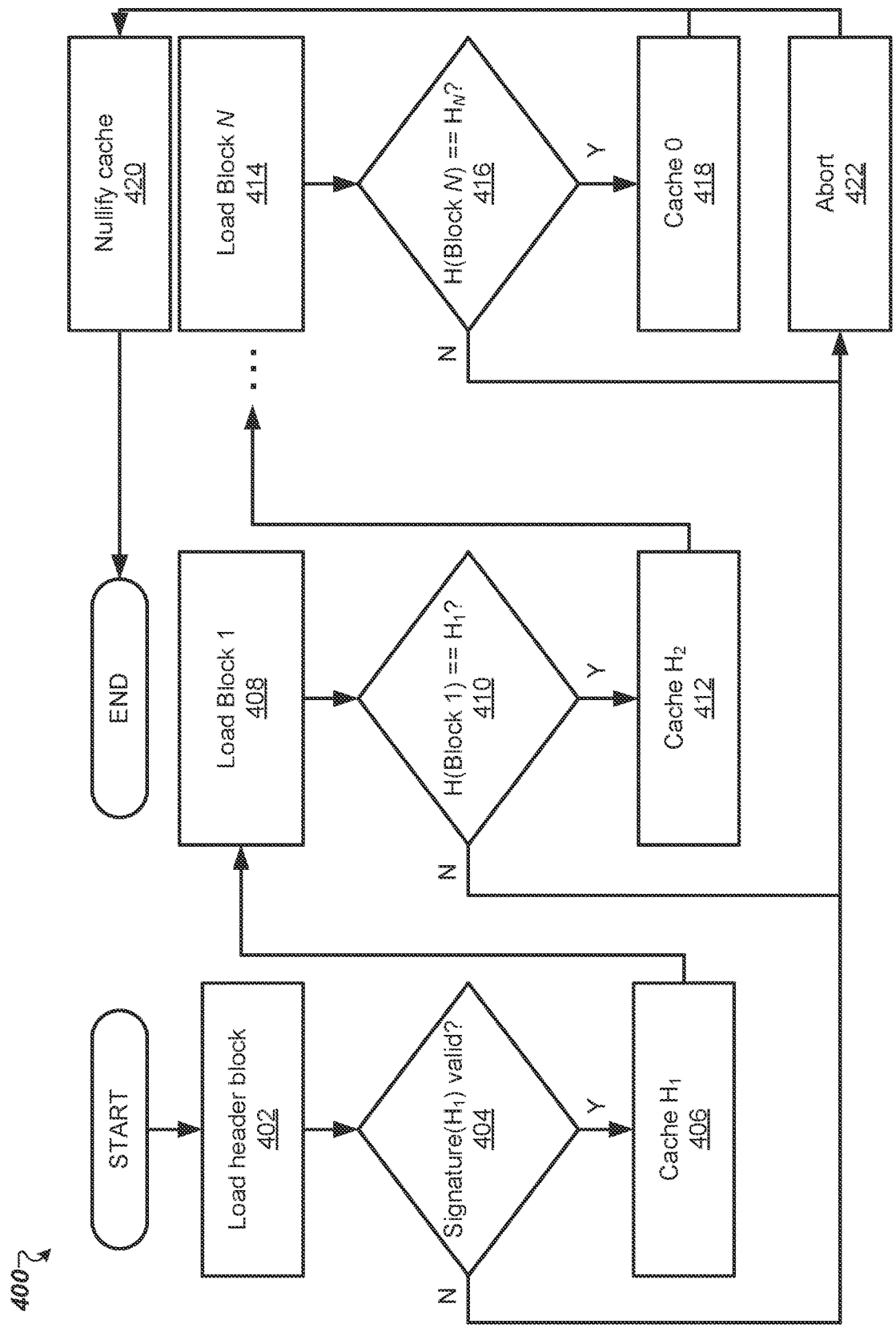
FIG. 4 is a flow diagram of an example method to authenticate an ordered set of blocks, in accordance with at least some embodiments.

FIG. 4 illustrates a flow diagram of a method 400 to authenticate an ordered set of blocks, according to at least one example embodiment. The method 400 can be performed by processing logic comprising hardware, software, firmware, or any combination thereof. In at least one embodiment, the method 400 is performed within a target device, such as the target device 120 described above with reference to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams are possible.

At operation 402, processing logic loads a header block of the ordered set of blocks and performs authentication of the header block. Loading the header block can include receiving the header block. For example, the header block can be received from data storage external to the target device ("external data storage"). The ordered set of blocks can further include a set of N data blocks including an initial data block (Block 1) and a final data block (Block N). The header block can include a digest of Block 1. In this example, the digest of Block 1 can include a hash of Block 1 ($H_1$). The header block can further include a header block payload that can be used to authenticate the header block. In this example, the header block payload can include a digital signature of $H_1$ (Signature($H_1$)).

Each of Block 1 through Block N can include a respective data block payload including a respective portion of data (e.g., test data), Portion 1 through Portion N. Moreover, each of Block 1 through Block N−1 can include a respective hash of a next block in the processing order. For example, Block 1 can include a hash of Block 2 ($H_2$), Block 2 can include a hash of Block 3 ($H_3$), etc. Block N can include a predefined data pattern indicating that Block N is the final block to be authenticated and processed. In this example, the predefined data pattern is a predefined number of "0" bits ("0").

At operation 404, processing logic determines whether Signature ($H_1$) is valid. For example, processing logic verify Signature ($H_1$), as described in further detail above with reference to FIGS. 1-3. If so, processing logic at operation 406 can cache $H_1$ in memory.

Thus, at operation 408, the processing logic can proceed to load Block 1. At operation 410, processing logic can determine whether $H_1$ (i.e., the stored hash of Block 1 extracted from the header block) is equal to H(Block 1) (i.e., a generated hash of Block 1, where H( ) is a hash function). For example, processing logic can, upon loading Block 1, compute H(Block 1). The determination at operation 410 is performed to determine whether the loaded Block 1 is authentic and its data has not been corrupted by an adverse party or otherwise. For example, processing logic can compare $H_1$ to H(Block 1) to determine whether they match. If so, at operation 412, processing logic can cache $H_2$ (e.g., cache). Although not explicitly shown, a similar process can be performed to authenticate Block 2 through Block N−1.

After authenticating Block N−1, at operation 414, processing logic can load Block N. At operation 416, processing logic can determine whether $H_N$ (i.e., the stored hash of Block N that was cached after the authentication of Block N−1) is equal to H(Block N) (i.e., a generated hash of Block N). For example, processing logic can, upon loading Block 1, compute H(Block N). The determination at operation 416 is performed to determine whether the loaded Block N is authentic and its data has not been corrupted by an adverse party or otherwise. For example, processing logic can compare $H_N$ to H(Block N) to determine whether they match. If so, at operation 418, processing logic can cache 0. As mentioned above, 0 is a data pattern that provides an indication that Block N is the final data block (and final block of the ordered set of blocks). At operation 420, processing logic can nullify (e.g., invalidate) the cache for data security and the process ends.

If any of the authentications is determined to be unsuccessful (e.g., the determinations at operation 404, operation 410 or operation 416 fail), this means that the corresponding block is not trustworthy. Thus, the processing logic at operation 422 can abort the process, and nullify the cache at operation 420. Further details regarding operations 402-422 are described above with reference to FIGS. 1-3.

Figure 5:
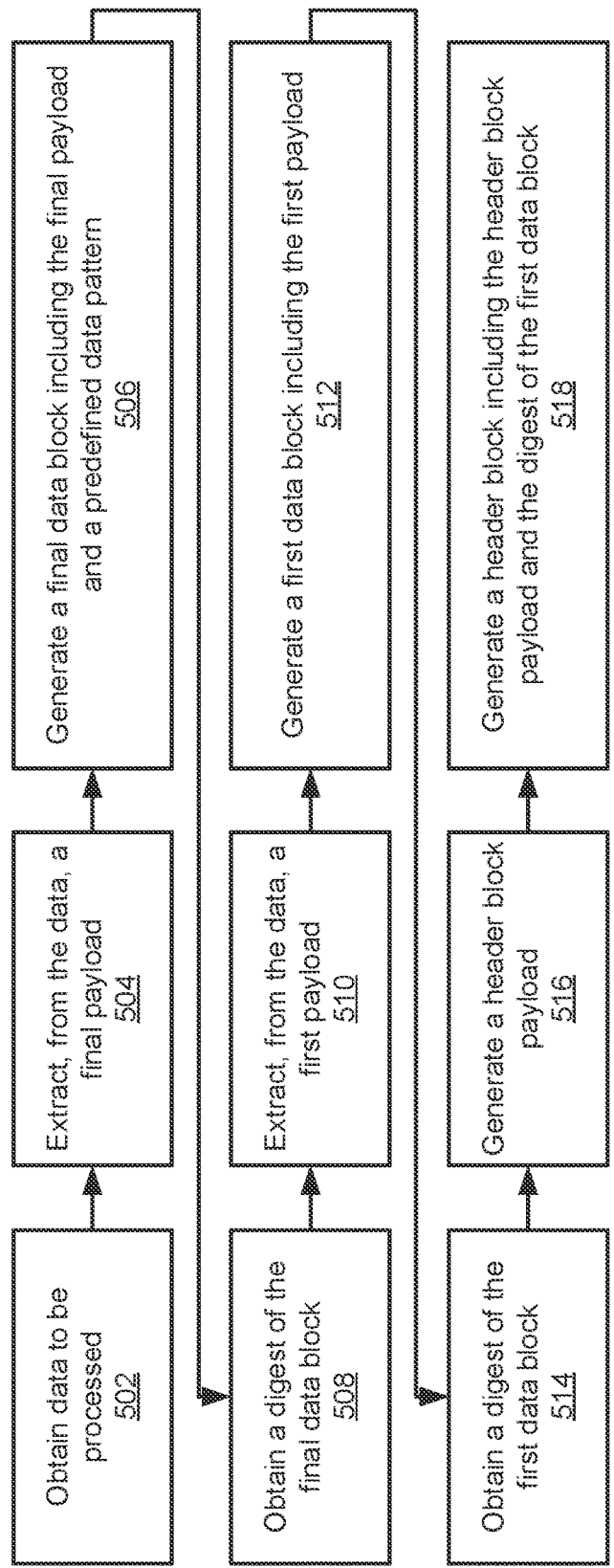
FIG. 5 is a flow diagram of an example method to obtain an ordered set of blocks, in accordance with at least some embodiments.

FIG. 5 illustrates a flow diagram of a method 500 to obtain an ordered set of blocks, according to at least one example embodiment. The method 500 can be performed by processing logic comprising hardware, software, firmware, or any combination thereof. In at least one embodiment, the method 500 is performed by a block generator, such as the block generator 105 described above with reference to FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams are possible.

At operation 502, processing logic can obtain data to be processed. For example, obtaining the data can include receiving a data stream. In some embodiments, the data includes raw data to be processed by a target device. For example, the data can include test data to be processed for performing a test on the target device (e.g., in-system testing (IST)). Examples of test data include deterministic scan test vectors (e.g., structural Automatic Test Pattern Generation (ATPG) vectors), logic built-in self-test (LBIST) sequences, memory built-in self-test (MBIST) sequences and/or Joint Test Action Group (JTAG) sequences.

An ordered set of blocks can be formed from the data. For example, the data can include test data to be processed by a target device (e.g., IST data). In some embodiments, the ordered set of blocks is a blockchain. The ordered set of blocks are organized in a processing order, while the Forming the ordered set of blocks can include generating each block of the ordered set of blocks in reverse order relative to the processing order.

More specifically, the header block is an initial block of the ordered set of blocks that is configured to be authenticated prior to initiating authentication and processing of the set of data blocks. After the header block, the data blocks are organized in order of the processing of their respective payloads by the target device.

At operation 504, processing logic can extract, from the data, a final payload. The final payload can include a final portion of the data to be processed by the target device. For example, the final payload can include a final portion of test data to be processed by the target device to perform a test (e.g., IST).

At operation 506, processing logic can generate a final data block including the final payload and a predefined data pattern. In some embodiments, generating the final data block includes generating the final data block including the final payload, and then inserting the predefined data pattern. The final data block is the last data block to be processed within the ordered set of blocks (i.e., a final block in the processing order). The predefined data pattern can be used to indicate that the final data block includes the final payload to be processed (e.g., the final portion of the data to be processed by the target device). For example, the predefined data pattern can be a predefined number of "0" bits.

At operation 508, processing logic can obtain a digest of the final data block. For example, the digest can be a hash of the final data block. As will be described in further detail below, the digest of the final data block can be used to generate the data block that will be processed immediately before the final data block in the processing order (i.e., a penultimate block of the ordered set of blocks).

At operation 510, processing logic can extract, from the data, a first payload to be processed. For example, the first payload can include a first portion of the data to be processed by the target device.

At operation 512, processing logic can generate a first data block including the first payload. The first data block can further include a digest of a second data block (e.g., hash). In some embodiments, generating the first data block includes generating the first data block including the first payload, and then inserting the digest of the second data block. The first data block is the initial data block to be processed within the ordered set of blocks (i.e., the first data block in the processing order). The digest of the second data block can be used to authenticate the second data block after authentication and processing of the first data block, as described above with reference to FIGS. 1A-4.

Prior to generating the first data block, processing logic can generate the penultimate data block through the second data block in a similar manner as the first data block. For example, the penultimate data block can be generated to include the digest of the final data block and a penultimate payload extracted from the data (e.g., a penultimate portion of test data to be processed by the target device to perform the test).

At operation 514, processing logic can obtain a digest of the first data block. For example, the digest can be a hash of the first data block.

At operation 516, processing logic can generate a header block payload. Instead of the header block payload including a portion of the data to be processed by the target device, the header block payload can include data for header block authentication. In some embodiments, generating the header block payload includes generating a digital signature of the digest of the first data block. The digital signature can be generated using a public key based digital signature algorithm (e.g., a PKI digital signature algorithm). For example, the digest of the first data block can be encrypted using a private key (e.g., a private key of the block generator).

At operation 518, processing logic can generate a header block including the header block payload and the digest of the first data block. In some embodiments, generating the header data block includes generating the header data block including the header block payload, and then inserting the digest of the first data block. Accordingly, the the header block is the final block to be generated.

Processing logic can then store the generated blocks within storage (e.g., storage external to the target device) for processing (e.g., testing within the target device). As described above with reference to FIGS. 1A-4, the header block can then be authenticated by the target device using the header block payload to determine whether to proceed with data processing (e.g., by verifying the digital signature using a corresponding public key). After authenticating the header block, the first data block can be authenticated using the digest of the first data block included within the header block, and the payload of the first data block can be processed upon successful authentication. Similarly, each data block can be authenticated and its respective payload can be processed in accordance with the processing order defined by the ordered set of blocks. Accordingly, the blocks of the ordered set of blocks can be generated in a reverse order relative to the processing order defined by the ordered set of blocks. Further details regarding operations 510-518 are described above with reference to FIGS. 1A-4.

Figure 6:
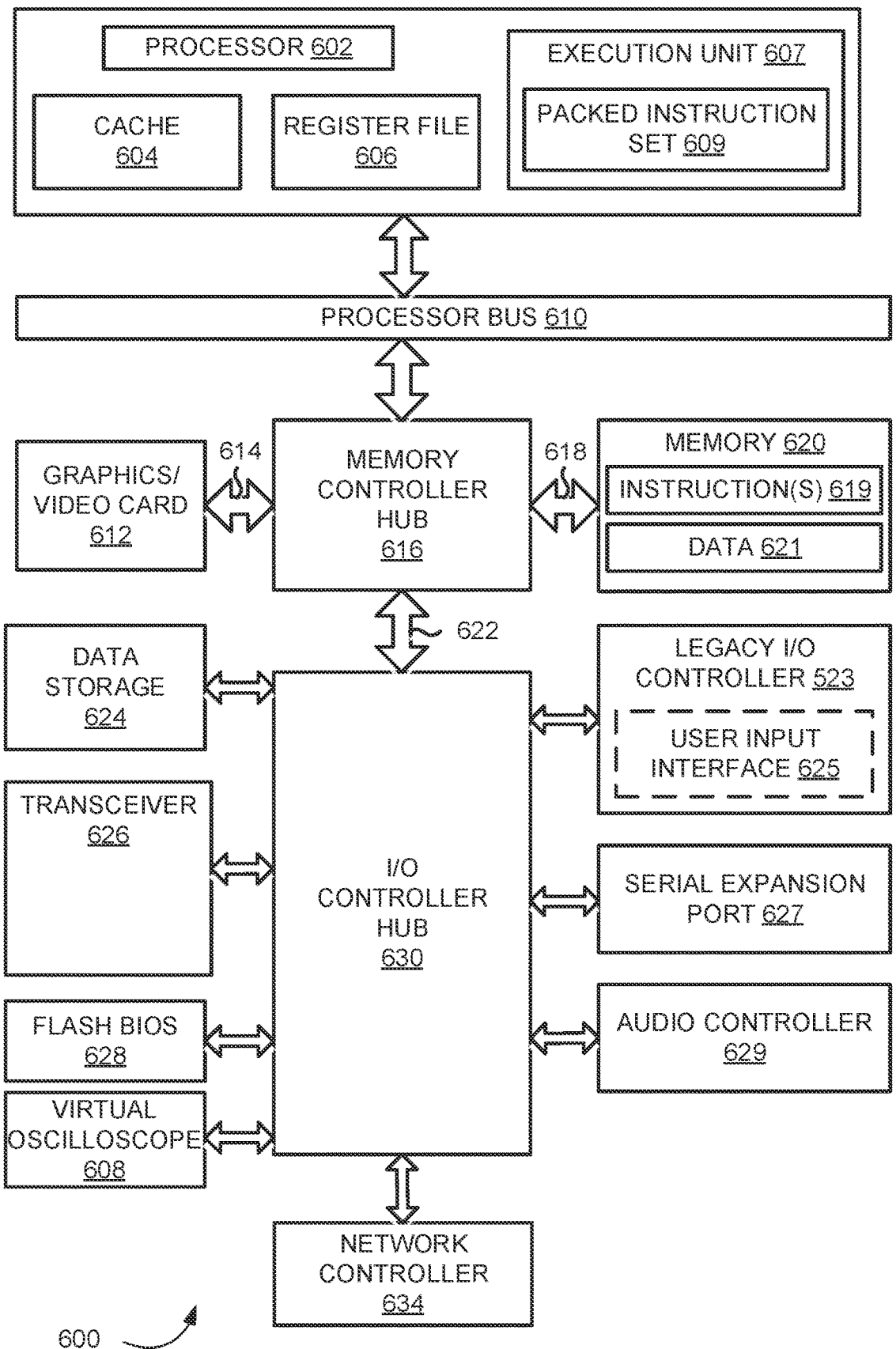
FIG. 6 illustrates an example computer system, in accordance with at least some embodiments.

FIG. 6 illustrates a computer system 600, in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read only memory ("ROM") that stores microcode for certain macro instructions. In at least one embodiment, execution unit 602 may include logic to handle a packed instruction set 509. In at least one embodiment, by including packed instruction set 509 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, flash memory device, or other memory device. Memory 620 may store instruction(s) 519 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and a system I/O 622. In at least one embodiment, system logic chip may provide a graphics port for coupling to a graphics controller. In at least one embodiment, MCH 616 may be coupled to memory 620 through high bandwidth memory path 618 and graphics/video card 612 may be coupled to MCH 616 through an Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage device. In an embodiment, the transceiver 626 includes a constrained FFE 608.

In at least one embodiment, FIG. 6 illustrates a system, which includes interconnected hardware devices or "chips" in the transceiver 626—e.g., the transceiver 626 includes a chip-to-chip interconnect. In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof. In at least one embodiment, one or more components of system 600 are interconnected using compute express link ("CXL") interconnects. Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "receiving," "determining," "obtaining," "generating," "initiating," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
    a memory; and
    a processing device, operatively coupled to the memory, to perform operations comprising:
        receiving a header block corresponding to an initial block of an ordered set of blocks of a blockchain, wherein the header block comprises a header block payload and a first digest, and wherein the first digest is a digest of a first data block of the ordered set of blocks;
        determining whether the header block is valid by authenticating the header block based on the header block payload;
        in response to determining that the header block is valid, receiving the first data block, wherein the first data block comprises a first data block payload and a second digest, and wherein the second digest is a digest of a second data block of the ordered set of blocks;
        determining whether the first data block is valid by authenticating the first data block based on the first digest; and
        in response to determining that the first data block is valid, processing the first data block payload.

2. The system of claim 1, wherein the header block payload comprises a digital signature of the digest, and wherein authenticating the header block comprises verifying the digital signature.

3. The system of claim 1, wherein authenticating the first data block comprises comparing a generated digest of the first data block to the first digest.

4. The system of claim 1, wherein the operations further comprise generating, in parallel for each data block of a subset of the ordered set of data blocks, a respective digest to authenticate a next data block of the ordered set of blocks.

5. The system of claim 1, wherein the operations further comprise, in response to determining that the header block is valid, purging the header block payload from the memory.

6. The system of claim 1, wherein the operations further comprise:
    receiving a final data block of the ordered set of blocks, wherein the final data block comprises a predefined data pattern and a final data block payload, and wherein the predefined data pattern indicates that the final data block is a final block of the ordered set of blocks;
    determining whether the final data block is valid by authenticating the final data block based on a digest of the final data block, wherein the digest of the final data block is comprised within a penultimate data block of the ordered set of blocks; and
    in response to determining that the final data block is valid, processing the final data block payload.

7. The system of claim 6, wherein the operations further comprise, in response to processing the final data block payload, purging at least one of the predefined data pattern or the final data block payload from the memory.

8. The system of claim 1, wherein processing the first data block payload further comprises processing a portion of test data comprised by the first data block payload to perform an in-system test.

9. The system of claim 1, wherein the first digest is a digest of the first data block, and wherein the second digest is a digest of a second data block immediately following the first data block in the ordered set of blocks.

10. A method comprising:
receiving, by a processing device, a header block corresponding to an initial block of an ordered set of blocks of a blockchain, wherein the header block comprises a header block payload and a first digest, and wherein the first digest is a digest of a first data block of the ordered set of blocks;
determining, by the processing device, whether the header block is valid by authenticating the header block based on the header block payload;
in response to determining that the header block is valid, receiving, by the processing device, the first data block, wherein the first data block comprises a first data block payload and a second digest, and wherein the second digest is a digest of a second data block of the ordered set of blocks;
determining, by the processing device, whether the first data block is valid by authenticating the first data block based on the first digest; and
in response to determining that the first data block is valid, processing the first data block payload.

11. The method of claim 10, wherein the header block payload comprises a digital signature of the digest, and wherein authenticating the header block comprises verifying the digital signature.

12. The method of claim 10, wherein authenticating the first data block comprises comparing a generated digest of the first data block to the first digest.

13. The method of claim 10, further comprising generating, by the processing device in parallel for each data block of a subset of the ordered set of data blocks, a respective digest to authenticate a next data block of the ordered set of blocks.

14. The method of claim 10, further comprising, in response to determining that the header block is valid, purging, by the processing device, the header block payload from memory.

15. The method of claim 10, further comprising:
receiving, by the processing device, a final data block of the ordered set of blocks, wherein the final data block comprises a predefined data pattern and a final data block payload, and wherein the predefined data pattern indicates that the final data block is a final block of the ordered set of blocks;
determining, by the processing device, whether the final data block is valid by authenticating the final data block based on a digest of the final data block, wherein the digest of the final data block is comprised within a penultimate data block of the ordered set of blocks; and
in response to determining that the final data block is valid, processing, by the processing device, the final data block payload.

16. The method of claim 15, further comprising, in response to processing the final data block payload, purging, by the processing device, at least one of the predefined data pattern or the final data block payload from memory.

17. The method of claim 10, wherein processing the first data block payload further comprises processing a portion of test data comprised by the first data block payload to perform an in-system test.

18. The method of claim 10, wherein the first digest is a digest of the first data block, and wherein the second digest is a digest of a second data block immediately following the first data block in the ordered set of blocks.

19. A non-transitory computer-readable storage medium comprising instructions that, when executed by a processing device, cause the processing device to perform operations comprising:
receiving, from test data storage, a header block corresponding to an initial block of an ordered set of blocks of a blockchain, wherein the header block comprises a first digest and a digital signature of the first digest, and wherein the first digest is a digest of a first test data block of the ordered set of blocks;
determining whether the header block is valid by authenticating the header block based on the digital signature;
in response to determining that the header block is valid, storing the first digest in memory to obtain a stored first digest;
receiving, from the test data storage, the first test data block, wherein the first test data block comprises a second digest and a first portion of test data, and wherein the second digest is a digest of a second test data block of the ordered set of blocks;
generating a digest of the first test data block to obtain a generated first digest;
determining whether the first test data block is valid by authenticating the first test data block by comparing the generated first digest to the stored first digest; and
in response to determining that the first test data block is valid, processing the first portion of test data to perform a test using the first portion of test data.

20. The non-transitory computer-readable storage medium of claim 19, wherein the operations further comprise:
receiving, from the test data storage, a final test data block of the ordered set of blocks, wherein the final test data block comprises a predefined data pattern and a final portion of test data, and wherein the predefined data pattern indicates that the final test data block is a final block of the ordered set of blocks;
determining whether the final test data block is valid by authenticating the final test data block based on a digest of the final test data block, wherein the digest of the final test data block is comprised within a penultimate data block of the ordered set of blocks;
in response to determining that the final test data block is valid, processing the final portion of test data to perform the test using the final portion of test data; and
in response to processing the final portion of test data, purging at least one of the predefined data pattern or the final portion of test data from memory.

* * * * *